March 24, 1931.  L. B. CHAPMAN  1,797,605
LOCKING PIN FASTENER
Filed July 1, 1930
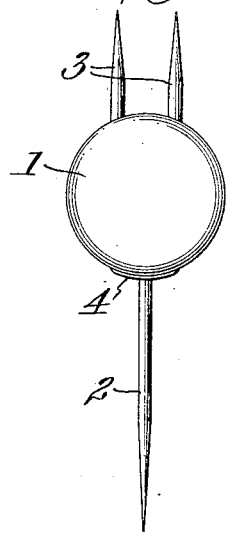
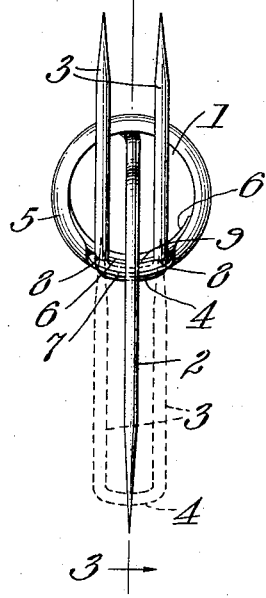
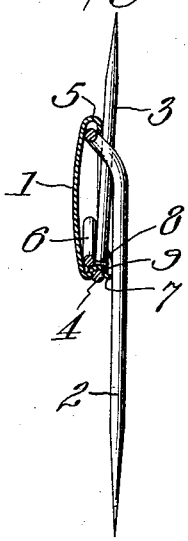
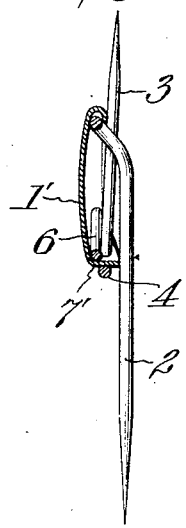
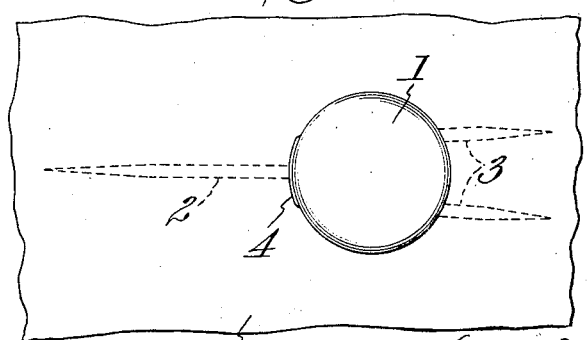
Inventor
Lyman B. Chapman
by
Attorney Patented Mar. 24, 1931

1,797,605

UNITED STATES PATENT OFFICE

LYMAN B. CHAPMAN, OF WATERBURY, CONNECTICUT, ASSIGNOR TO SCOVILL MANUFACTURING COMPANY, OF WATERBURY, CONNECTICUT, A CORPORATION OF CONNECTICUT

LOCKING-PIN FASTENER

Application filed July 1, 1930. Serial No. 465,187.

This invention relates to pin fasteners such as are used for attaching slip covers to the upholstery of the seats and body panels of automobiles and other vehicles.

The object of the invention is to provide pin fasteners of this general character with means whereby when the pin fasteners are inserted in desired cover-retaining position they will be prevented from withdrawing.

The invention consists in what may be termed a locking pin fastener, comprising a shell or cap and a main pin so assembled as to produce a unitary structure, and a locking pin carried by the shell or cap and adjustable relatively thereto, the points of the two pins being arranged in opposed directions, so that when the pin fastener is in use with the locking pin inserted, withdrawal of the fastener will be prevented, as will be hereinafter more particularly explained and finally claimed.

In the accompanying drawings illustrating the invention, in the several figures of which like parts are similarly designated, Figure 1 is a front elevation of a locking pin fastener embodying the features of the invention. Fig. 2 is a rear elevation thereof, the locking pin being shown withdrawn in broken lines. Fig. 3 is a sectional elevation taken substantially on the line 3—3 of Fig. 2. Fig. 4 is a sectional elevation showing the pin fastener as applied in use. Fig. 5 is an elevation of the parts shown in Fig. 4. Fig. 6 is a sectional elevation similar to Fig. 3 but illustrating a modified form of shell or cap.

The locking pin fastener has a shell or cap 1, a main pin 2 and a locking pin of double-pointed form having the two pin legs 3 straddling the main pin 2 and joined by a connecting bend 4.

The shell or cap 1 has an offstanding flange 5 closed throughout the major portion of its perimeter upon a ring-like portion 6 of the main pin 2, whereby the cap is retained upon the pin and these two parts assembled as a unitary structure. A portion 7 of the flange 5, preferably lying adjacent to the main pin 2, extends away from the shell or cap 1 in unclosed condition and is perforated or pierced as indicated at 8 to receive the legs 3 of the double-pointed locking pin in adjustable sliding engagement. Moreover, as shown in Figs. 2, 3 and 4, this portion 7 of the flange is provided with a recess or depression 9 adjacent to and including the perforations 8 and adapted, when the locking pin is fully inserted, to receive the connecting bend 4 of the locking pin so that its outer surface projects only slightly beyond the flange portion 7, as shown. Sufficient clearance is provided between the connecting bend 4 and the edges of the recess or depression 9, however, to permit the insertion of a pin, knife point or other relatively sharp or thin instrument to start the withdrawal of the locking pin when desired.

In the modified form of the invention illustrated in Fig. 6, the recess or depression 9 is dispensed with and the connecting bend 4 of the locking pin abuts against a plain face of the portion 7' of the shell or cap 1'.

In using the locking pin fastener, for example in attaching a slip cover to the upholstery of an automobile, the locking pin is removed from the shell or cap, and then the main pin 2 is fully inserted through the material of the slip cover, indicated at 10, Figs. 4 and 5, and into the upholstery indicated at 11. Then the legs 3 of the locking pin are inserted through the perforations 8 and the locking pin forced through the cover material 10 and into the upholstery 11 into full inserted position, substantially as shown.

With the pin fastener thus adjusted it will be seen that the main pin 2 and the legs 3 of the locking pin extend into the material in opposed directions and at opposite inclinations, and that the pin fastener cannot tilt away from the slip cover and cannot be withdrawn.

Moreover, the forcing of the locking pin into the material will naturally cause its legs 3 to spread apart, as indicated in broken lines in Fig. 5, and thus any tendency of the locking pin to work loose or withdraw from the material during use is offset.

Obviously, when it is desired to remove or withdraw the pin fastener, it is only necessary to remove the locking pin by means of its connecting bend 4 and then withdraw the main pin 2 from the material.

Various changes are considered to be within the spirit of the invention and the scope of the following claims.

What I claim is:

1. A locking pin fastener, having a shell and a main pin assembled to produce a unitary structure, and a locking pin removably carried by said shell and slidable relatively thereto, said main pin and locking pin when inserted in material in normal fastening position being so opposed as to prevent withdrawal of the pin fastener from the material.

2. A locking pin fastener, having a shell and a main pin assembled to produce a unitary structure, said shell provided with an offstanding flange, and a locking pin carried by said flange and slidable relatively thereto, said main pin and locking pin when inserted in material in normal fastening position being so opposed as to prevent withdrawal of the pin fastener from the material.

3. A locking pin fastener, having a shell and a main pin assembled to produce a unitary structure, said shell provided with an offstanding flange, and a double-pointed locking pin passing through and carried by said flange and slidable relatively thereto, said main pin and locking pin when inserted in material in normal fastening position being so opposed as to prevent withdrawal of the pin fastener from the material.

4. A locking pin fastener, having a flanged shell and a main pin, said main pin provided with a portion cooperating with said flange and upon which the flange is closed throughout a portion of its perimeter to hold the shell upon the pin, the unclosed portion of said flange being perforated, and a locking pin passing through the perforated portion of said flange and adjustably carried thereby, said main pin and locking pin when inserted in material in normal fastening position being so opposed as to prevent withdrawal of the pin fastener.

5. A locking pin fastener, having a shell and a single-pointed main pin assembled as a unitary structure, and a double-pointed locking pin adjustably carried by said shell and straddling said main pin, said main pin and locking pin when inserted in material in normal fastening position being so opposed as to prevent withdrawal of the pin fastener, and said locking pin being withdrawable from the material to permit removal therefrom of the pin fastener.

6. A locking pin fastener, having a shell and a main pin assembled as a unitary structure, said shell provided with an offstanding flange, said flange having a portion perforated to receive a locking pin, and a double-pointed locking pin having its two pin legs joined by a connecting bend and passing through the perforations of said flange, the portion of said flange provided with said perforations having a recess substantially conforming to said connecting bend and adapted to receive same when said locking pin is fully inserted.

7. A locking pin fastener, having a shell and a main pin assembled in fixed relation to each other, and a locking pin removably carried by said shell and adjustable relatively thereto, said main pin and locking pin having their points arranged in opposed directions, whereby when the pin fastener is inserted in material and the locking pin inserted in locking position, withdrawal of the pin fastener from the material will be prevented.

8. In a locking pin fastener, a shell, a single-pointed main pin assembled therewith in fixed relation thereto, and a double-pointed locking pin detachably carried by said shell, said main pin and locking pin having their points arranged in opposed directions, whereby when the pin fastener is inserted in material and the locking pin inserted in locking position, withdrawal of the pin fastener from the material will be prevented.

9. In a locking pin fastener, a shell, a single-pointed main pin assembled therewith in fixed relation thereto, and a double-pointed locking pin detachably carried by said shell and straddling said main pin, said main pin and locking pin having their points arranged in opposed directions, whereby when the pin fastener is inserted in material and the locking pin inserted in locking position, withdrawal of the pin fastener from the material will be prevented.

In testimony whereof I have hereunto set my hand this 30th day of June, A. D. 1930.

LYMAN B. CHAPMAN.